(12) United States Patent
Honda et al.

(10) Patent No.: US 9,628,748 B2
(45) Date of Patent: Apr. 18, 2017

(54) IMAGING DEVICE AND IMAGING METHOD USING DIVIDED FRAMES TO AVOID SATURATION IN MOVIE IMAGE DATA

(71) Applicant: Olympus Corporation, Shibuya-ku, Tokyo (JP)

(72) Inventors: Tsutomu Honda, Hachioji (JP); Hiroaki Iwasaki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/831,603

(22) Filed: Aug. 20, 2015

(65) Prior Publication Data

US 2016/0073050 A1 Mar. 10, 2016

(30) Foreign Application Priority Data

Sep. 8, 2014 (JP) ................. 2014-182020

(51) Int. Cl.
*H04N 5/77* (2006.01)
*H04N 5/235* (2006.01)
*H04N 5/243* (2006.01)
*H04N 5/238* (2006.01)
*H04N 9/804* (2006.01)
*H04N 9/82* (2006.01)

(52) U.S. Cl.
CPC .............. *H04N 5/77* (2013.01); *H04N 5/238* (2013.01); *H04N 5/2352* (2013.01); *H04N 5/2353* (2013.01); *H04N 5/243* (2013.01); *H04N 9/8042* (2013.01); *H04N 9/8211* (2013.01)

(58) Field of Classification Search
CPC ........................................ H04N 5/77
See application file for complete search history.

(56) References Cited

U.S. PATENT DOCUMENTS 8,023,004 B2 * 9/2011 Asoma ............... H04N 5/23245
348/221.1

FOREIGN PATENT DOCUMENTS

JP 2007-189295 7/2007

* cited by examiner

*Primary Examiner* — Gary C Vieaux
(74) *Attorney, Agent, or Firm* — John C. Pokotylo; Straub & Pokotylo

(57) ABSTRACT

An imaging device, for carrying out movie recording at a specified frame rate, comprises an imaging unit for outputting movie image data, a divided period calculation section for obtaining a second period that is shorter than the first period based on the frame rate, a switching designation section for designating selective switching of the first period and the second period, an image combining circuit for performing image combination and a control circuit for carrying out control so that while image combination is not carried out by the image combining circuit on image data that was formed with the switching designation section designating the first period, for image data that was formed with the second period being designated, a plurality of image data that was acquired within the first period is subjected to image combination by the image combining circuit to generate a combined image and acquire a movie.

14 Claims, 9 Drawing Sheets

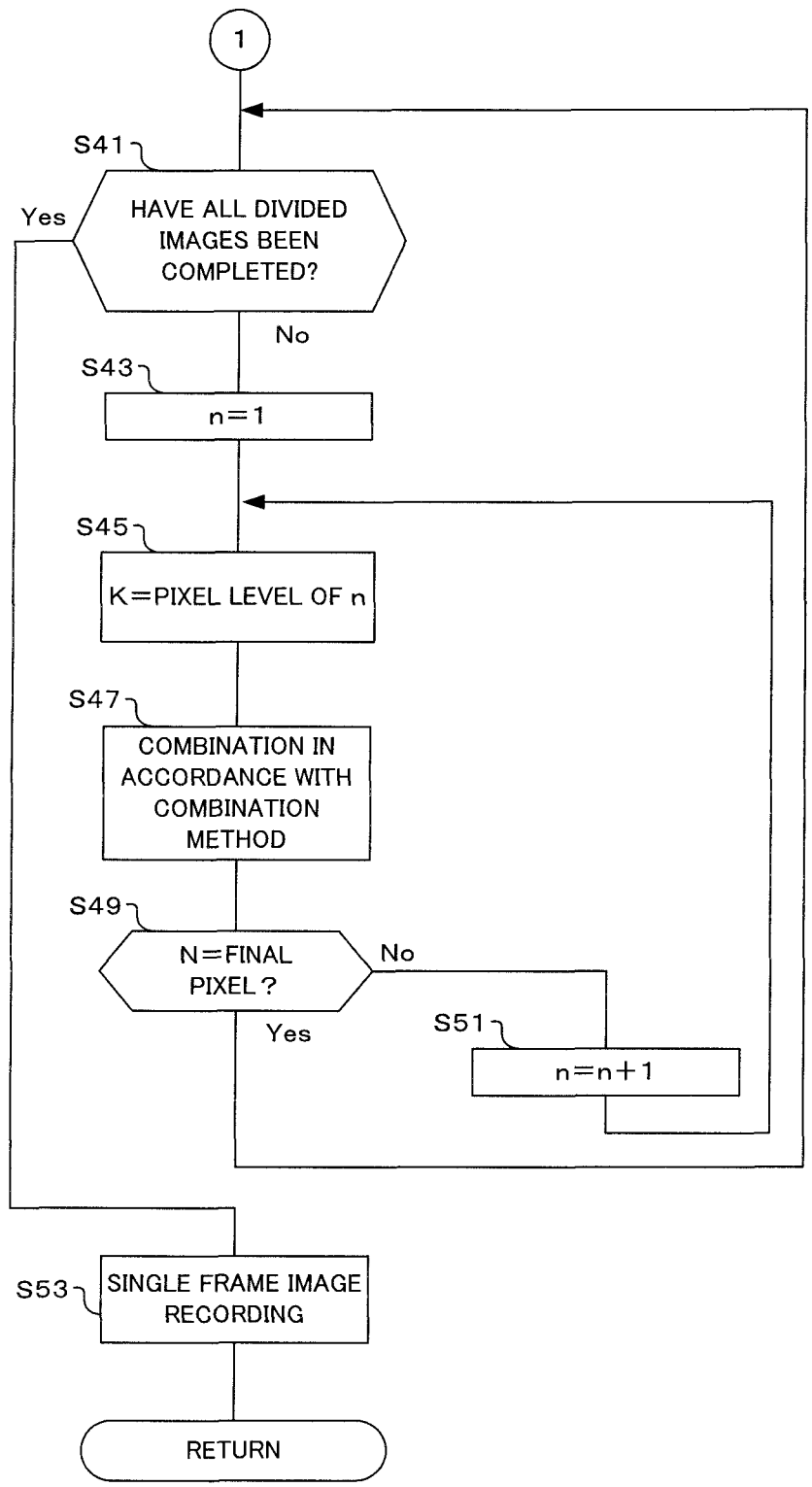

FIRST　SECOND　THIRD　FOURTH　COMBI-
IMAGE　IMAGE　　IMAGE　IMAGE　　NATION

FIRST　SECOND　THIRD　FOURTH　COMBI-
IMAGE　IMAGE　　IMAGE　IMAGE　　NATION

REFERENCE
VALUE 1

FIRST　SECOND　THIRD　FOURTH　COMBI-
IMAGE　IMAGE　　IMAGE　IMAGE　　NATION

REFERENCE
VALUE 1

FIRST　SECOND　THIRD　FOURTH　COMBI-
IMAGE　IMAGE　　IMAGE　IMAGE　　NATION

FIRST　SECOND　THIRD　FOURTH　COMBI-
IMAGE　IMAGE　　IMAGE　IMAGE　　NATION

IMAGING DEVICE AND IMAGING METHOD USING DIVIDED FRAMES TO AVOID SATURATION IN MOVIE IMAGE DATA

Benefit is claimed, under 35 U.S.C. §119, to the filing date of prior Japanese Patent Application No. 2014-182020 filed on Sep. 8, 2014. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method for carrying out movie recording at a specified frame rate, and in detail relates to an imaging device and imaging method for acquiring a plurality of image data with a specified frame rate divided into two or more, and then recording by combining the plurality of image data.

2. Description of the Related Art

Movie recording repeatedly forms images at a specified frame rate, and at the time of movie playback images that have been continuously taken are sequentially played back in accordance with frame rate. If movie recording is performed at a shutter speed that is shorter than a time determined by frame rate in a case where a subject is bright, exposure time of each frame is shorter than the time determined by frame rate, and so at the time of movie playback continuity of each frame image becomes bad resulting in playback appearing like a so-called flickering animation, which is not conducive to smooth image playback.

In Japanese patent laid open No. 2007-189295 (hereafter referred to as Patent Literature 1), therefore, at the time of movie recording, with a subject that has movement shutter speed (exposure time) within a single frame is made long and edge enhancement is weakened, whereas with a subject that does not have movement shutter speed is made faster and edge enhancement is intensified.

SUMMARY OF THE INVENTION

As has been described above, in the case of movie recording there are restrictions on frame rate (for example 60 fps). While brightness of an image is constant, in order to carry out smooth video recording with no animation-like flicker, aperture value and gain are changed in accordance with shutter speed within a range of time constraint for determined frame rate, and an ND (neutral density) filter is inserted into or removed from the optical path.

Specifically, since it is not possible to make shutter speed much faster that the determined frame rate, it is necessary to carry out aperture drive to conform with subject brightness. At that time, if aperture drive speed is made fast in order to achieving an aperture drive within a time determined by frame rate, to the human eye it is likely to result in an image that becomes momentarily dark, as if the viewer had blinked. In high definition video recording it is necessary to prevent this type of degradation in image quality. The same type of degradation in image quality also arises when an ND filter is inserted or removed.

Besides exposure adjustment using the above-described aperture and ND filter, a method for adjusting gain of the image sensor has been considered. However, with a method that lowers gain of saturated image data, it is not possible to reproduce lost image data. Specifically, even if taken image data is changed to a lower limit of gain (0 dB) or lower, in a case where saturation has already occurred at the image sensor, it is not possible to maintain linearity and it is not possible to reproduce the tones of an original image. For example, with 8-bit tone, in the case of a light amount that results in saturation (in this case 255), if gain is lowered by 6 dB the value will become 127 and it will not be possible for tone reproduction above this.

Also, in the case of a subject that has movement in a bright environment, if the shutter speed does not conform to the determined frame rate (for example, 1/30th of a second in the case of HD30P), it is not possible to capture all movements. If the shutter speed (exposure time) within a single frame is increased, then since not all movement can be recorded it results in jerky movements, like an animation.

An object of the present invention is to provide an imaging device and an imaging method for recording movies so that it is possible to playback with each frame image continuously joined.

An imaging device of the present invention, for carrying out movie recording at a specified frame rate, comprises an imaging unit for repeatedly carrying out imaging at a designated period, and outputting movie image data, a divided period calculation section for obtaining a second period that is shorter than a first period based on the frame rate, a switching designation section for designating selective switching of the first period and the second period, to the imaging unit, an image combining circuit for performing image combination on a plurality of image data that have been formed in the second period within the first period, to generate a combined image, and a control circuit for carrying out control so that while image combination is not carried out by the image combining circuit on image data that was formed by the image unit with the first period being instructed by the switching designation section, for image data that was formed with the second period being designated combination is carried out by the image combining circuit with a plurality of image data that was acquired within the first period to generate a combined image, and to acquire a movie.

An imaging method of the present invention, for carrying out movie recording at a specified frame rate, comprises repeatedly carrying out imaging at a period that has been designated to an imaging unit, and outputting movie image data, obtaining a second period that is shorter than the first period based on the frame rate, carrying out switching designation for the imaging by selective switching of the first period and the second period, and carrying out control so that while image combination is not carried on image data that was formed with the first period designated to the imaging unit, a plurality of image data that were acquired in the first period are subjected to image combination by the image combining circuit with image data that was formed with the second period being designated, to generate a combined image and acquire a movie.

BRIEF DESCRIPTION OF THE DRAWINGS

FIG. 8 is a flowchart showing recording operation of the camera of one embodiment of the present invention.

DETAILED DESCRIPTION OF THE PREFERRED EMBODIMENTS

Preferred embodiments using a camera to which the present invention has been applied will be described in the following in accordance with the drawings. A camera of a preferred embodiment of the present invention is a digital camera, and, in summary, subjects image data to live view display on a display unit on the basis of image signals read out from an image sensor, and also carries out movie shooting at a specified frame rate and stores image data for a movie that has been subjected to image processing for storage in external memory in response to operation of a movie button. In the event that at this time subject brightness is such that pixel data is saturated, exposure time for a single frame is divided, and shooting is carried out divided into two or more frames. Image data for a plurality of divided frames is then combined, to acquire an image for a single frame.

Figure 1:
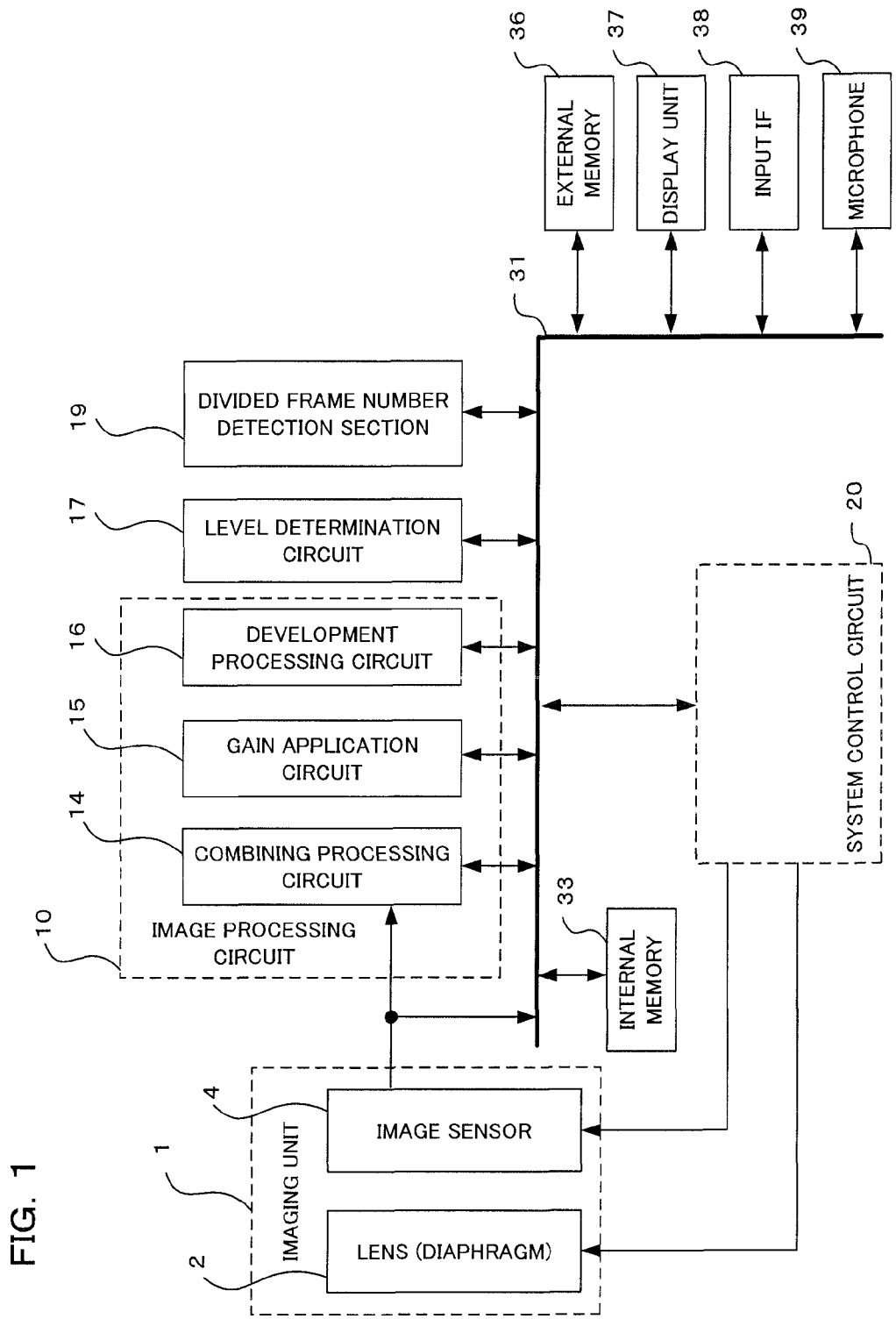
FIG. 1 is a block diagram mainly showing the electrical circuits of a camera of one embodiment of the present invention.

FIG. 1 is a block diagram mainly showing the electrical structure of a camera of one embodiment of the present invention. The camera of this embodiment comprises an imaging unit 1, an image processing circuit 10, system control circuit 20 and a bus 31, with each circuit being connected to this bus. With this embodiment, a lens 2 included in the imaging unit 1 is integrally formed with the camera body, but this integral structure is not limiting and it is also possible to have an interchangeable lens for use with an interchangeable lens camera.

Inside the imaging unit 1 there are the lens 2 and image sensor 4. The lens 2 forms an optical image of the subject on the image sensor 4. An aperture for adjusting aperture value in order to adjust exposure amount is provided inside this lens 2. The image sensor 4 includes an image sensor such as a CMOS image sensor or a CCD image sensor, and converts an optical image of a subject that has been formed by the lens 2 into electrical signals for every pixel, before outputting image signals to the image processing circuit 10 and the bus 31. The bus 31 is a signal line for exchanging signals between each block.

The image sensor 4 also has an electronic shutter that is a global shutter or a rolling shutter, and can control exposure time corresponding to a single frame or divided frames. The image sensor 4 functions as an imaging unit for repeatedly carried out imaging at a designated period, and outputting movie image data.

The image processing circuit 10 subjects image signals output from the image sensor 4 to image processing, and comprises a combining processing circuit 14, gain application circuit 15 and a development processing circuit 16.

The combining processing circuit 14 performs combination processing on outputs for every respectively corresponding pixel, within a plurality of image data corresponding to a plurality of frames that have been read out from the image sensor 4, to generate combined image data. As this combination processing, there is averaging combination, comparatively bright combination, comparatively dark combination, comparatively bright combination for determining threshold, and comparatively dark combination for determining threshold. With this embodiment, averaging combination is used as the image combination, and the processing for this example will be described later using FIG. 4. Combination processing other than this will be described later as a modified example of this embodiment, using FIG. 9. The combining processing circuit 14 functions as an image combining circuit for performing image combination on a plurality of image data that have been formed in the second period within the first period, to generate a combined image.

The gain application circuit 15 multiplies image data by a specified gain value. Besides a plus gain, the gain value may also be a minus gain, and as one example of minus gain, for example, by multiplying by a gain value of ½, image data output becomes ½, and it is possible to apply a neutral density effect equivalent to that of an ND2 filter (a filter that reduces light amount to ½). Also, if the digital ND setting value is ND eight, for example, image data is multiplied by ⅛. The gain value can be set by the user by means of the input IF 38 etc. In this way it is possible for the gain application circuit 15 to realize a so-called neutral density effect.

The development processing circuit 16 carries out development processing such as demosaicing, white balance adjustment, gamma correction and image compression etc. on RAW image data (image data before development processing, which will be described later) that has been generated by the combining processing circuit 14.

A level determination circuit 17 determines output level of the pixel data. With this embodiment, since a number of divisions for repeating imaging per single frame (hereafter referred to as number of divisions) is determined so that pixel data does not reach a saturation level, this level determination circuit 17 determines whether or not the saturation level has been reached. Whether or not the pixel data has reached the saturation level is determined using saturation output for number of bits of raw image data. It is possible to display the output level of the pixel data and for the user to make determination, to set number of divisions while carrying out adjustment.

A divided frame number detection section 19 detects a number of frames in which image data from the image sensor 4 is not saturated, when it has been determined by the level determination circuit 17 that pixel output of the image data is saturated. Specifically, during live view display exposure time for a predetermined single frame is divided and exposure is carried out at this divided frame time, it is determined in the level determination circuit 17 whether the pixel data is not saturated, and frame number is incremented until pixel data is no longer saturated. The divided frame number detection section 19 functions as a division period calculating section for obtaining a first period based on frame rate at the time of movie recording, and a second period that is shorter than the first period. With this embodiment, the second period uses a value that is the first period divided by an integer of two or neatly divisible by an integer of two or more, as will be described later using FIG. 5.

While the frame number may be incremented until all pixel data is no longer saturated, it is also possible to increment a number of divisions until saturated pixels become a fixed proportion or less compared to the total number of pixels. Also, besides detecting level of pixel data while actually changing a number of divisions, it is also possible to calculate the number of divisions based on level of the pixel data (average brightness level or peak brightness level etc.). Also, while this divided frame number detection section 19 is constituted by a hardware circuit, it may also be executed using a CPU within the system control circuit 20 armed a program that has been stored in internal memory 33.

Besides the previous described imaging unit 1, image processing circuit 10, level determination circuit 17, and divided frame number detection section 19, the internal memory 33, an external memory 36, display unit 37, input IF 38, microphone 39 and the system control circuit 20 are also connected to the bus 31.

The internal memory 33 stores various setting information required in camera operation and program code required for execution by the system control circuit 20, and temporarily stores images currently being processed at the time of image processing. The internal memory 33 is constituted by a nonvolatile memory such as flash memory or volatile memory such as DRAM.

The external memory 36 is a non-volatile storage medium that can be removed from the camera body or is fixed inside the camera, such as, for example, an SD card or a CF card. This external memory 36 stores image data that has been subjected to development processing by the development processing circuit 16, and at the time of playback it is possible to read stored image data and output externally to the camera.

The display unit 37 is a rear surface display unit such as a TFT (Thin Film Transistor) liquid crystal device or organic EL display device, or an EVF (electronic viewfinder), and displays images that have been developed by the development processing circuit 16.

The input IF 38 has operating members such as a shutter release button and a movie button, and a touch panel for inputting touch operations on a rear surface display section etc., and carries out various mode settings and designation of shooting operations such as movie recording, based on user operation.

The microphone 39 converts surrounding sounds at the time of movie recording to an analog signal. This analog sound signal is converted to digital sound data, and stored in the external memory 36 together with image data for the movie.

The system control circuit 20 has a CPU (Central Processing Unit), and carries out overall control of the camera in accordance with program code stored in the internal memory 33. The system control circuit 20 transmits control signals to each part included in the imaging unit 1 shown previously. Similarly, the system control circuit 20 also receives output signals from the imaging unit 1 via the bus 31. As well as this, control signals are exchanged not only with the previously described image processing circuit 10, level determination circuit 17, and divided frame number detection section 19, but also with various sections of the internal memory 33, external memory 36, display unit 37, input IF 38, and microphone 39.

The system control circuit 20 also functions as a switching designation section for designating selective switching of the first period and the second period to the imaging unit (refer to S9, S11 and S13 in FIG. 2, which will we described later). The system control circuit 20 also functions as a control circuit for carrying out control such that while image combination is not carried out by the image combining circuit for image data that has been formed with with first period being designated to the imaging unit by the switching designation section, for image data that has been formed with the second period being designated a combined image for a plurality of image data that have been acquired within the first period is generated by the image combining circuit, and a movie acquired (refer to S17 of FIG. 2, FIG. 7 and FIG. 8, which will be described later).

Next, operation of this embodiment will be described using the flowchart shown in FIG. 2. This flowchart (the same also applies to the flowcharts shown in FIG. 7 and FIG. 8 that will be descried later) is executed by the system control circuit 20 controlling each circuit in accordance with program code stored in the internal memory 31.

Figure 2:
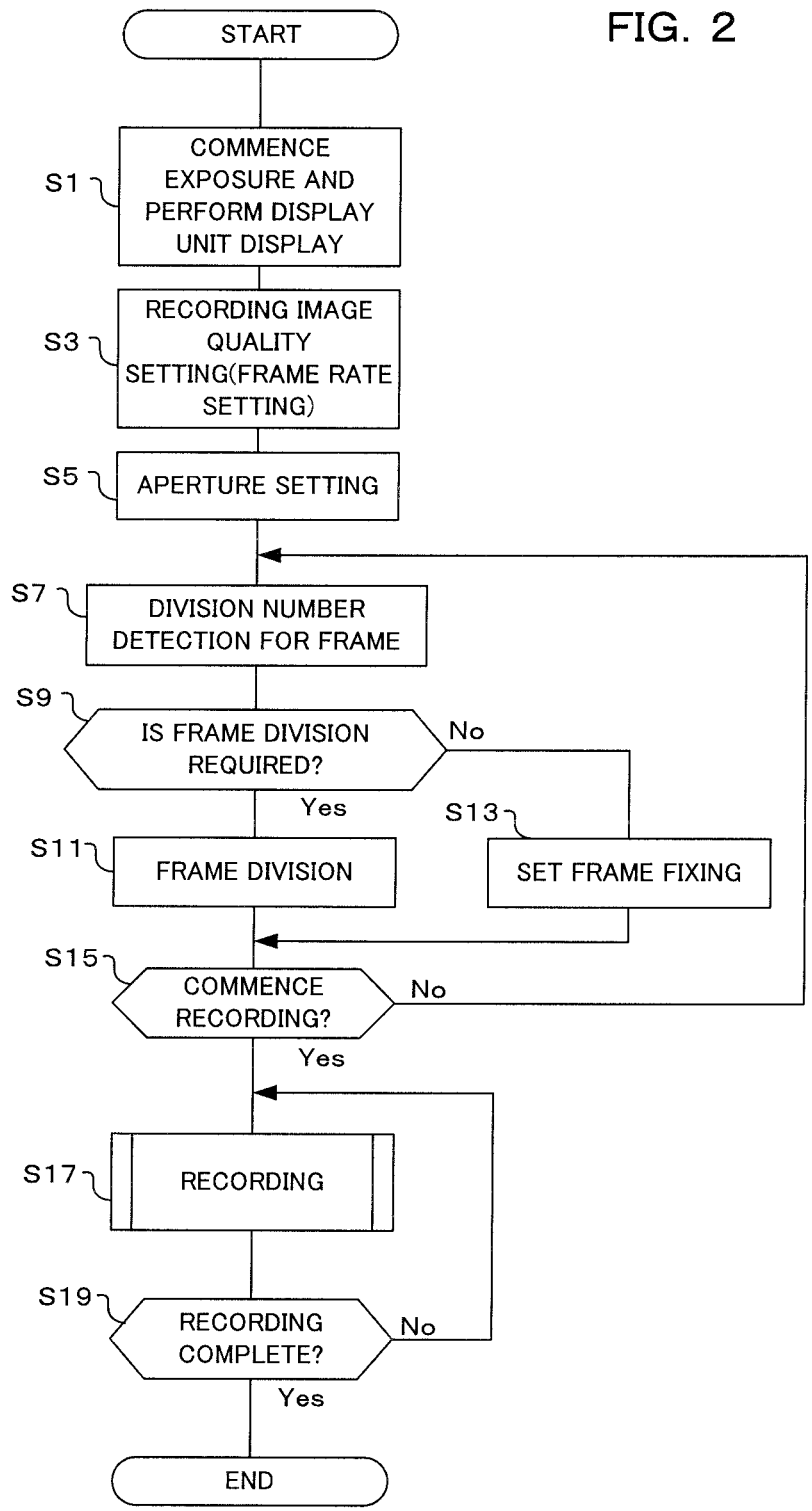
FIG. 2 is a flowchart showing main operation of the camera of one embodiment of the present invention.

If a power supply is turned on using a power switch or the like, the system control circuit 20 starts processing based on the processing flow shown in FIG. 2. First exposure is commenced, and the display unit carries out live view display (S1). Here, the image processing circuit 10 carries out image processing for live view display on the image data from the image sensor 4, and displays a live view image on the display unit 37. The photographer observes the live view display, and determines composition and when to shoot a still image or shoot a movie.

Once live view display has been carried out in step S1, next recording image quality is set (S3). Here, setting of frame rate for movie recording is carried out. Setting of frame rate is carried out using the input IF 38. Frame rate represents the number of images per second at the time of movie recording, and is generally set to a value such as 30 or 60.

Once recording image quality setting has been carried out in step S3, aperture setting is next carried out (S5). Here, required subject brightness and background Bokeh state are confirmed, and an aperture value for aperture (provided within the lens 2) is calculated, and aperture control is carried out so as to attain this aperture value.

Once aperture setting has been carried out in step S5, next detection of division number for repeating imaging for a single frame is carried out (S7). Here, the divided frame number detection section 19 detects division number at which pixel data becomes a non-saturated level, based on image data. Specifically, division number is incremented until the pixel data becomes less than a saturation level. Accordingly, if the level of pixel data of image data that has been acquired at the frame rate that was set in step S3 is below a saturation level, incrementing of the division number is not carried out, but if the saturation level is exceeded the division number is incremented until it is determined by the level determination circuit 17 that the saturation level is not exceeded. In the event that the pixel data is too large, aperture value is changed. Also, in a case where pixel data is small with a division number of warm, control is carried out so as to open the aperture. Before commencing the recording, the aperture value may be changed, but since there will be degradation in quality of a movie once recording starts, it is preferred to not change the aperture value.

Once detection of frame division number has been carried out in step S7, it is next determined whether or not it is necessary to divide a single frame (S9). Determination here is based on the detection result for frame division number in step S7. Specifically, as long as the result of detection is one or less it is determined that it is not necessary to divide a single frame.

If the result of determination in step S9 is that frame division is necessary, frame division setting is carried out (S11). Here, setting of division number in order to divide a single frame by the division number that was detected in step S7 is carried out.

On the other hand, if the result of determination in step S9 is that frame division is not necessary, a setting frame is fixed (S13). Here, the frame rate that was set in step S3 is kept as it is. In the event the image data gain is insufficient, the gain application circuit 15 applies gain.

Once the frame division or fixing has been carried out in step S11 or S13, it is next determined whether or not recording has started (S15). When the photographer has commenced shooting of a movie, since the movie button (or shutter release button) is operated, the determination here is based on a signal representing operating state of the movie button (or shutter release button) from the input IF 38. If the result of this determination is that recording has not started, processing returns to step S7 and processing such as the previously described live view display is repeated.

On the other hand, if the result of determination in step S15 is that recording has started, next "recording" is carried out (S17). Here the image sensor 4 carries out exposure during an exposure time that is equivalent to a period resulting from a single frame having been divided, using an electronic shutter, and after exposure image data is readout from the image sensor 4. Image processing for movie storage is then carried out by the image processing circuit 10 on the plurality of image data that have been read out, and storage of an image file to the external memory 36 is carried out. In performing this image processing, a plurality of images for a divided single frame are combined by being averaged for every pixel, in accordance with level of the pixel data, to generate a combined image. Divided exposure for a single frame will be described later using FIG. 3, and image combination using averaging will be described later using FIG. 4.

Once processing for "recording" has been carried out in step S17, it is next determined whether or not recording is complete (S19). When the photographer has completed shooting of a movie, since the movie button (or shutter release button) is operated again, the determination here is based on a signal representing operating state of the movie button (or shutter release button) from the input IF 38. If the result of this determination is that recording is not completed, processing returns to step S17 and processing such as the previously described "recording" is repeated. The divided exposure processing in step S17 may also be started.

On the other hand, if the result of determination in step S19 is recording complete, this processing flow is terminated and the power supply is turned off.

In this way, in the processing flow of this embodiment, in a case where image data is saturated, a single frame is divided into a plurality of divided frames (refer to S7, S9 and S11 in FIG. 2), constituting a period where pixel data of the movie is no longer saturated. Image data from the divided frame that has been exposed in this period is then subjected to image combination to obtain image data for a single frame (refer to S17 in FIG. 2). As a result it is possible to perform playback with each frame continuously joined. Specifically, in the event that pixel data is saturated if image data is acquired at an exposure time determined by the period of a single frame, a single frame is divided and images for a single frame are combined using image data that has been acquired in divided frames, which means that since the subject is being exposed for an overall exposure time determined by the period of a single frame, exposure is seamless and as a result it is possible to continuously join each frame image of the movie.

Figure 3:
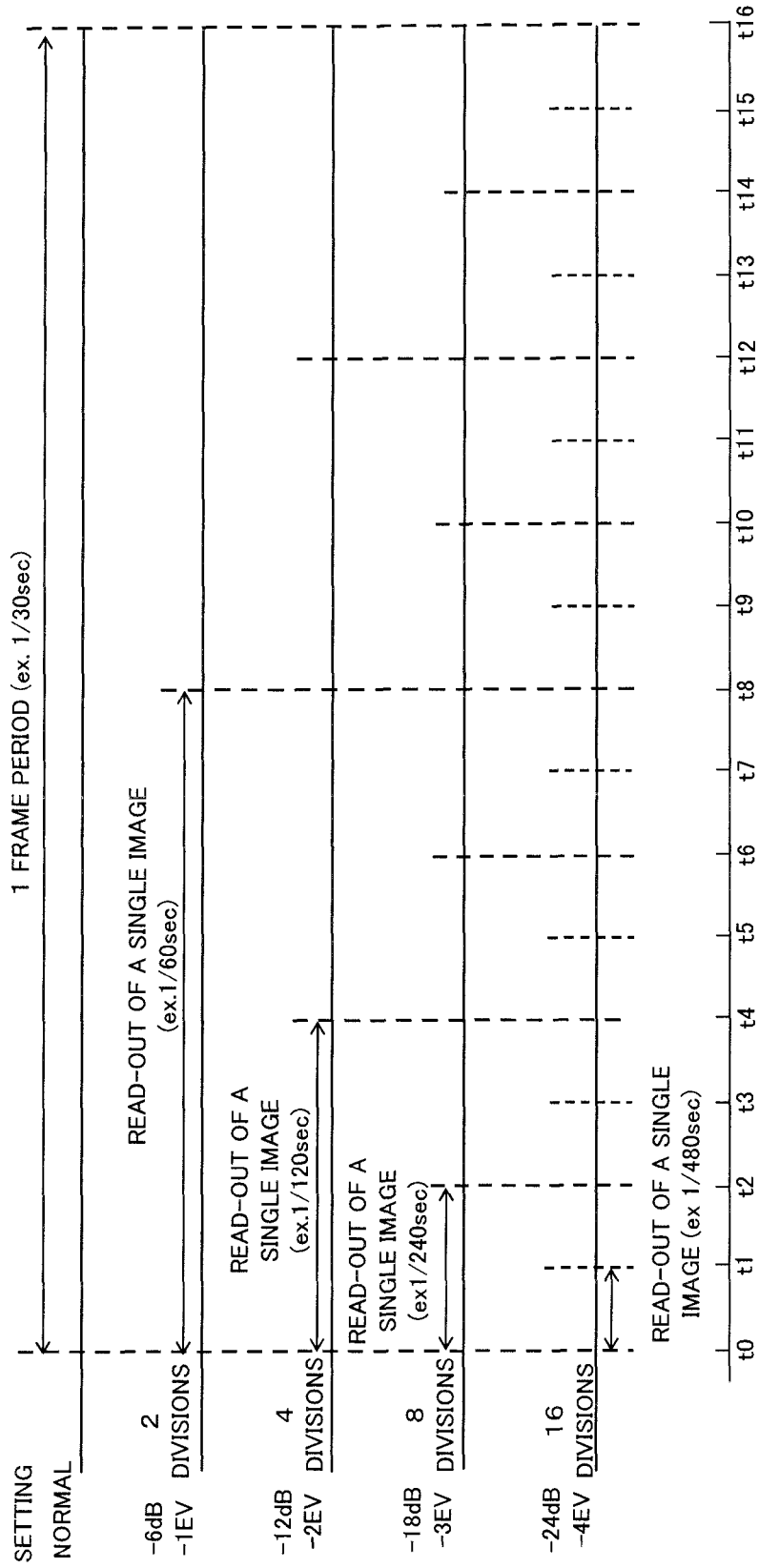
FIG. 3 is a drawing for describing frame division, with the camera of one embodiment of the present invention.

Next, exposure time (exposure period) of a divided frame in the case of dividing a single frame will be described using FIG. 3. This exposure period is set in step S11 or at the time of storage in step S17. The example shown in FIG. 3 is for a case where a single frame is $\frac{1}{30}$th of a second. In the event that pixel data constituting the image data is saturated, the division number is incremented in the order of two divisions, four divisions, eight divisions and 16 divisions, and the division number where the pixel data is not saturated is determined (refer to S7 in FIG. 2).

For example, in the case where the division number is 2, first image data for a frame that has been divided at an exposure time of $\frac{1}{2}$($\frac{1}{60}$th of a second with the example in FIG. 3) that of the exposure time corresponding to the frame rate ($\frac{1}{30}$th of a second in the example of FIG. 3) is acquired (t0-t8), and next second image data of the divided frame is acquired at an exposure of $\frac{1}{2}$(t8-t16). In the case where the division number is two, it is possible to acquire image data for two divided frames.

Similarly, in the case where the division number is 16, first of all first image data for a divided frame is acquired at an exposure time of $\frac{1}{16}$(t0-t1), and subsequently respective second to sixteenth image data are acquired at the exposure time of $\frac{1}{16}$ at t1-t2, t2-t3, . . . , t15-t16.

Similarly, as shown in FIG. 3, the case where division number is 2 is equivalent to a single step drop in EV level (corresponding to −6 dB), the case where division number is 4 is equivalent to a two step drop in EV level (corresponding to −12 dB), the case where division number is 8 is equivalent to a three step drop in EV level (corresponding to −18 dB), and the case where division number is 14 is equivalent to a four step drop in EV level (corresponding to −24 dB). Exposure time is controlled by the electronic shutter within the image sensor 4.

In this way, with this embodiment, exposure time for a single frame (first period) is divided into a plurality of shorter exposure times (second period), to such an extent that pixel data within the image data is no longer saturated. In FIG. 3, the exposure time for a single frame was $\frac{1}{30}$th of a second, but this is not limiting and the exposure time may be shorter or longer. Also, examples of the division number are 2-16, but it may be more.

Next, the image combination carried out in step S17 will be described using FIG. 4. With this embodiment, as was described previously, averaged combination is carried out as the image combination. With averaged combination, imaging is carried out using divided exposure to such an extent that there is no saturation, and by applying minus gain for added portions a combined image that is not saturated at the shutter speed that has been set is generated.

Figure 4:
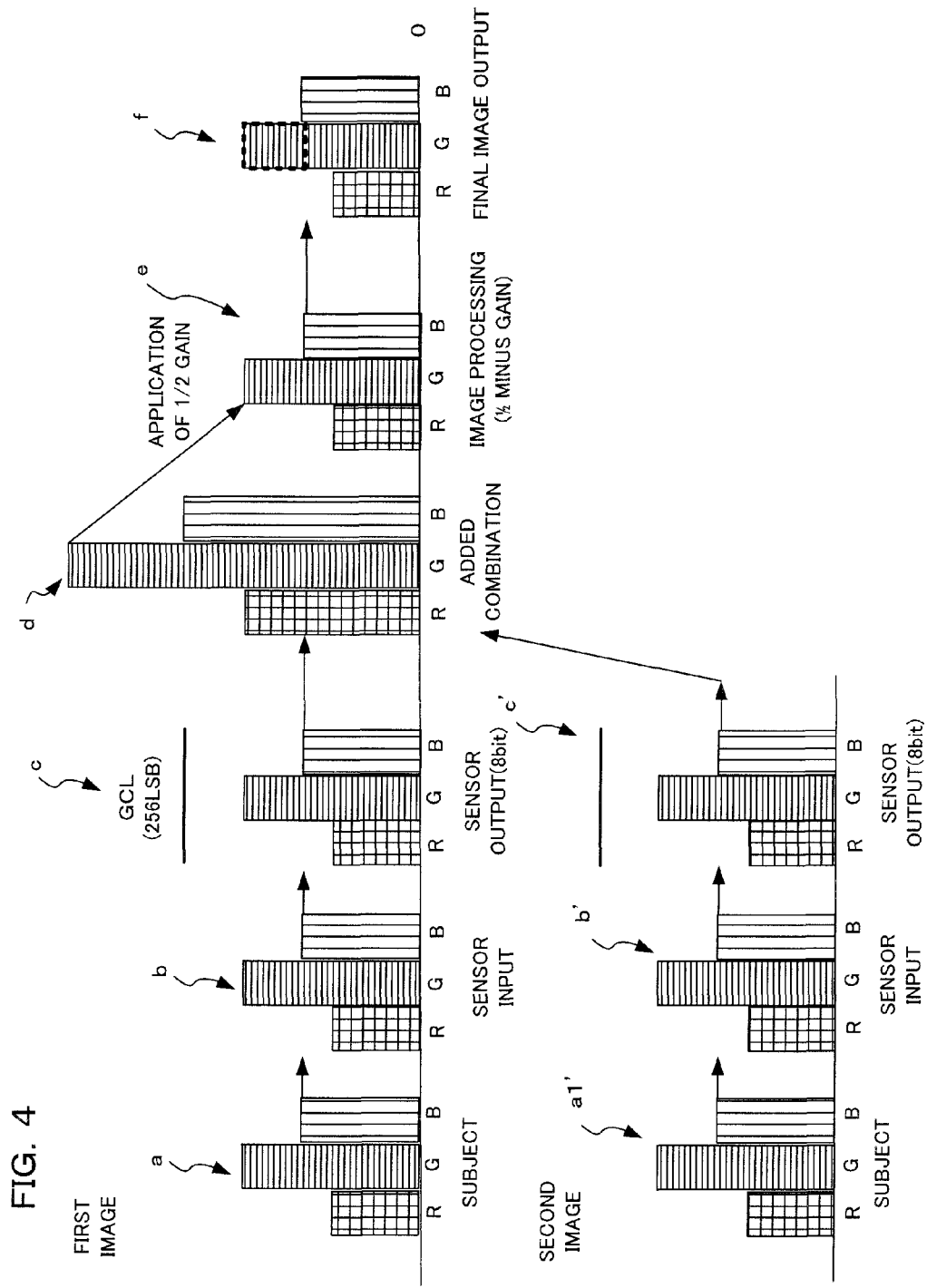
FIG. 4 is a drawing showing a modified example of image combination when divided exposure has been carried out, with the camera of one embodiment of the present invention.

With this embodiment, as shown in FIG. 4, a plurality of images are acquired using exposure for every frame that has been divided so that the output of the image sensor 4 is not saturated (two divided exposures with the example shown in FIG. 4), combination is carried out for each of the plurality of acquired images, and an image is acquired by applying minus gain in order to lower portions where addition would have resulted in excessive values. In this way, it is possible to acquire an image with lowered output, without the occurrence of blown out highlights, similarly to if an ND filter had been inserted.

Specifically, a-c of FIG. 4 show subject brightness, image sensor input and image sensor output at the time of the first divided exposure, while a'-c' show subject brightness, image sensor input and image sensor output at the time of the second divided exposure. With two divided exposures, since each divided exposure time becomes ½, image sensor output also becomes ½, and sensor output is not clipped at the saturation level GCL (refer to c and c3' in FIG. 4).

Once the first divided exposure is completed image data is read out and temporarily stored, then once the second divided exposure is completed image data is read out, and the combining processing circuit 14 performs additive combination of the two sets of image data that have read-out (refer to d in FIG. 4). Once additive combination has been carried out, next minus gain (here, ½) is applied (multiplication processing) to the image data that has been subjected to additive combination.

The ratios of R/G/B for the final image output to which minus gain has been applied are the same as the ratios of R/G/B for the subject (refer to f in FIG. 4). Portions shown by the dotted square in f of FIG. 4 are reproduced the same as the original image.

The combining processing circuit 14 carries out image combination using averaging as shown in FIG. 4. The combining processing circuit 14 functions as an image combining circuit for performing image combination after brightness information of a plurality of image data have been subjected to averaging processing.

With the example of image combination using averaging that was shown in FIG. 4, even in a case where image data that was acquired at the exposure time for a single frame is saturated, as a result of combining image data that were acquired using a plurality of divided frames, each pixel data is not saturated and no blown out highlights occur in the image. However, since it is necessary to store the image data that has been acquired using a plurality of divided frames for every divided frame, then compared to the case of carrying out comparatively bright combination or comparatively dark combination shown in FIG. 7 and FIG. 8, an increased memory capacity is required for image data storage. With the example shown in FIG. 4, a single frame is divided into two, but this is not limiting, and it is possible to appropriately change the division number, to four or eight divisions etc.

Next, a first modified example of exposure time (exposure period) of a frame in the case of dividing a single frame will be described using FIG. 5. With the example that was shown in FIG. 3, since the division number is a power of two, if all divided frames are aligned they will precisely match with a single frame. With this first modified example FIG. 5, a case where the division number is not a power of two, and the case where frames do not exactly match to a single frame with clock alignment, are shown.

Figure 5:
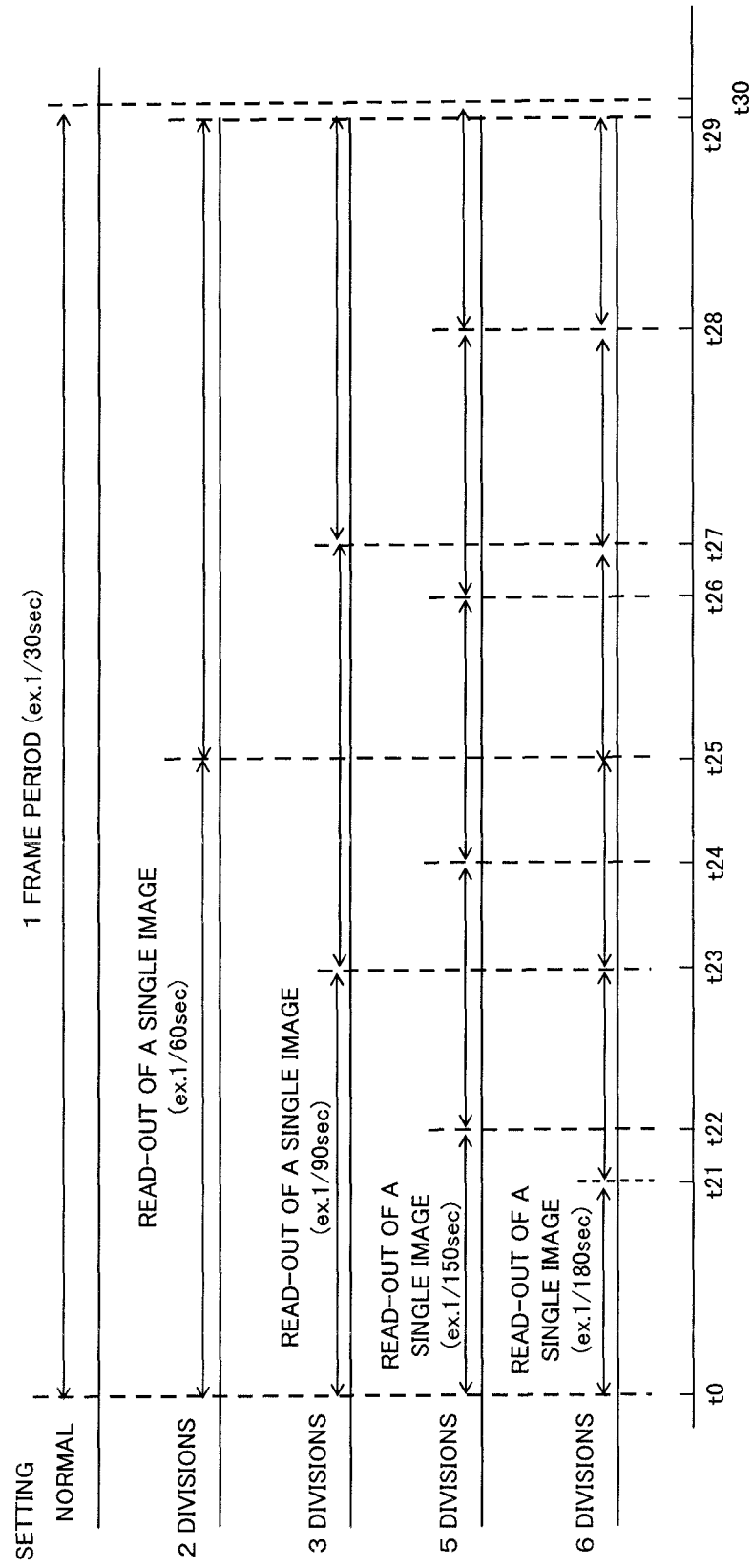
FIG. 5 is a drawing for describing a first modified example of frame division, with the camera of one embodiment of the present invention.

With the example shown in FIG. 5, divisions of three and six are used as the division number, which are obviously not a power of two. Also, a single frame period is time t0-t30, but even if exposure periods of divided frames are aligned they will run from time t0-t29, and time t29-t30 is a period in which exposure is not carried out. Since there is no exposure during time t29-t30, at the time of playing back a movie the image will disappear in this period, but since this period is short it will not cause any disconcerting feeling as a movie. Conversely, the period where there is no exposure may be made a short period to the extent that as a movie it causes no disconcerting feeling.

Next, a second modified example of exposure time (exposure period) of a frame in the case of dividing a single frame will be described using FIG. 6. With the example shown in FIG. 3 and FIG. 5, exposure was carried out for all of the time divided frames. For example, in FIG. 3, in the case of the division number of 16, exposure is performed in each of times t0-t1, t1-t2, t2-t3, . . . . Also, in FIG. 5, in the case of a division number of 6, exposure is carried out for each of times t0-t21, t21-t23, t23-t25, . . . .

Figure 6:
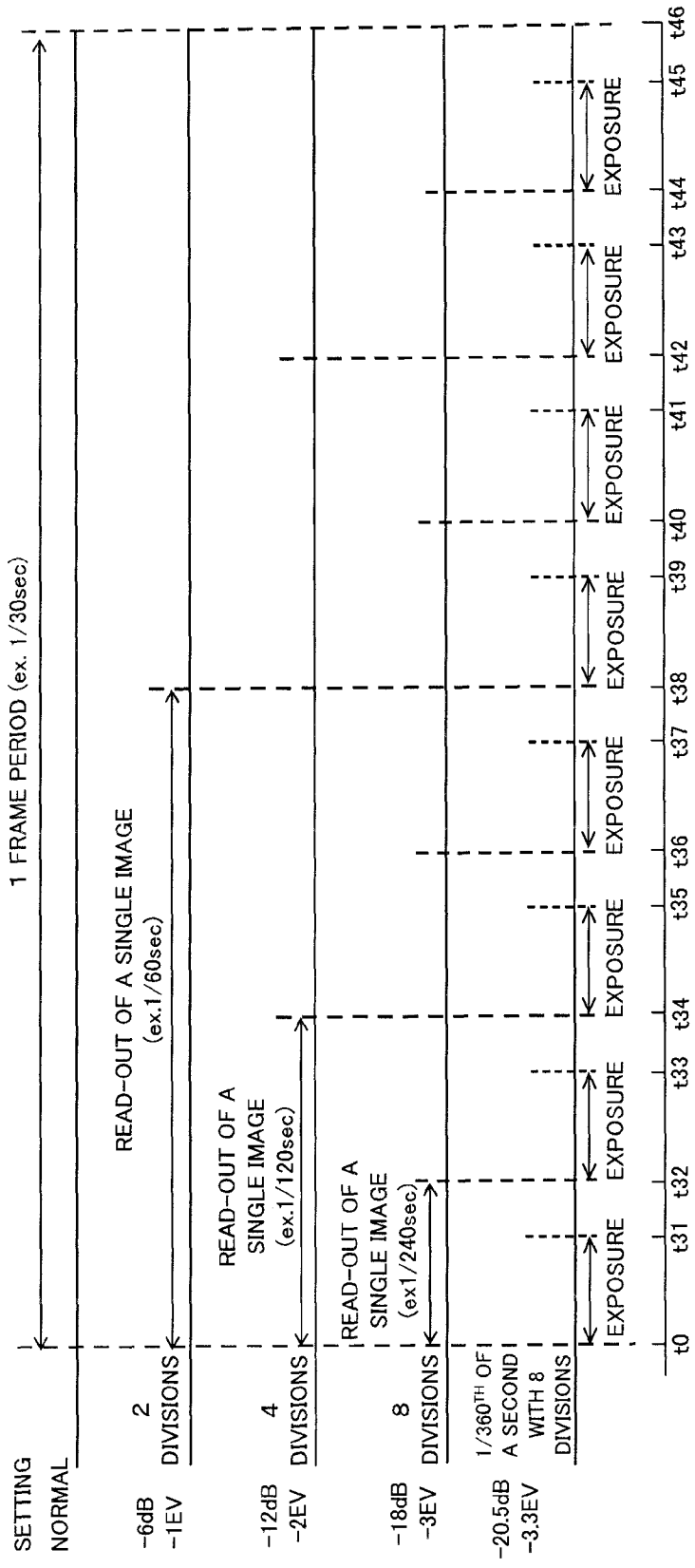
FIG. 6 is a drawing for describing a second modified example of frame division, with the camera of one embodiment of the present invention.

Conversely, with the second modified example of frame exposure time shown in FIG. 6, exposure is carried out for the time of some of the respectively divided frames, but exposure is not carried out for the entire time. For example, in FIG. 6, in the case of an exposure time of 1/360th of a second with a division number of 8, exposure is carried out at time t0-t31, during time t31-t34 exposure is not carried out, the exposure is performed from time t32-t33 while exposure is not carried out during time t33-t34, . . . , exposure is carried out from time t44-t45 while exposure is not carried out during time t45-t46.

In this way, with the second modification of frame exposure time, exposure is not carried out for the entire duration of divided frames of a single frame. Since there is a time frame where exposure is not carried out, there is a possibility of unnaturalness like a jerky animation arising when playing back a movie image, but since the time where there is no exposure is short there is hardly any detrimental effect. Also, with this modified example, the degree of freedom in adjusting exposure time is high, and obtaining correct exposure in accordance with subject brightness becomes easy.

Figure 7:
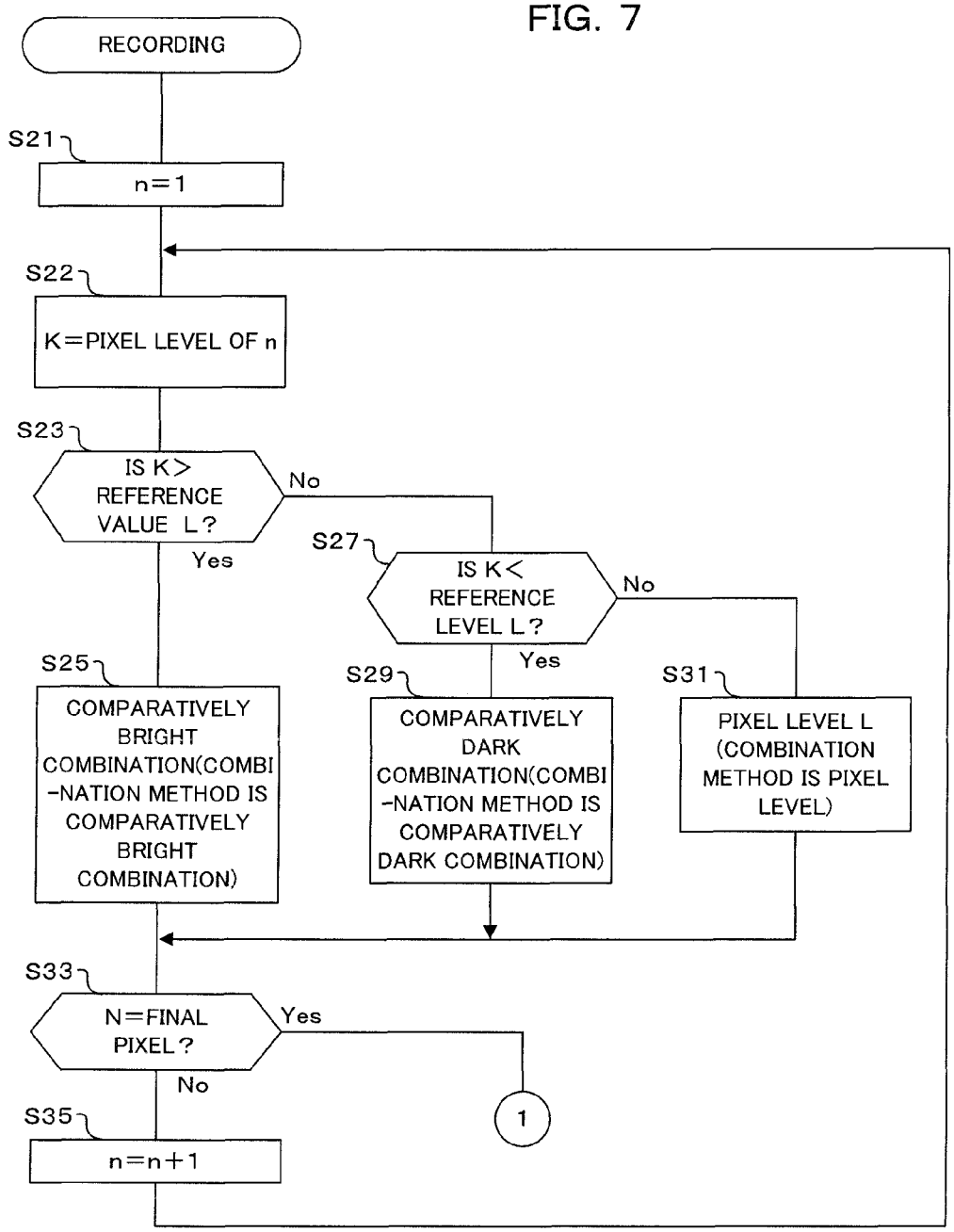
FIG. 7 is a flowchart showing recording operation of the camera of one embodiment of the present invention.
Figure 9A:
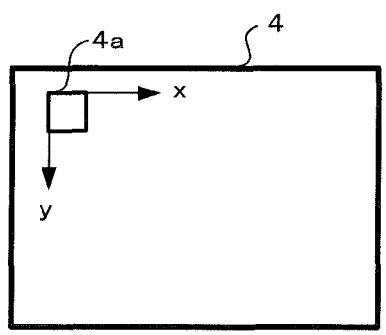
FIG. 9A to FIG. 9F are drawings for describing image combination, with a modified example of the camera of one embodiment of the present invention.

Next, a modified example of operation at the time of "recording" in step S17 will be described using the flowcharts shown in FIG. 7 and FIG. 8, and also FIG. 9. With this modified example, a threshold level is determined, and comparatively bright combination and comparatively dark combination are carried out as the image combination. If the processing flow for "recording" is entered, first n, representing pixel position, is set to n=1 (S21). Here pixel position n represents a sequence for pixel data constituting image data. For example, a pixel position of 4a in FIG. 9A is made n=1. The pixel data is numbered with pixel position n from 1 to a number for the final pixel, and detection of pixel level K carried out in step S22 is carried out for all pixel data by repeatedly executing steps S22-S35.

In step S21, if n representing pixel position is set to n=1, next pixel level K of the nth pixel position is determined (S22). Here, image data of a first divided frame is input from the image sensor 4, and pixel level K of pixel data for a nth pixel position pixel constituting the image data is detected.

Once the nth pixel position pixel level K has been detected in step S22, it is next determined whether or not the level K is larger than a reference value L (S23). This determination is carried out by comparing the pixel level K of the nth pixel position that was detected in step S22 with the reference value L (referred to FIG. 9D and FIG. 9E). With this embodiment, in the event that the pixel level K is larger than the reference value L comparatively bright combination is carried out, while if the pixel level K is smaller than the reference value L comparatively dark combination is carried out, and in the event that the pixel level K of the reference value L are the same, the read-out pixel level is kept as it is.

The reference value L is calculated based on image data before movie recording. When the image overall is bright the reference value L may be set high, and when the subject overall is dark the reference value L may be set low. Pixel data is stored in memory 33 for every pixel. With the processing of step S25 the memory 33 is initialized with a pixel level K that has been read out from the image sensor 4.

At a pixel position where the result of determination in step S23 was that the pixel level K was larger than the reference value L, a combination method is set to comparatively bright combination (S25). Here, as a combination method for step S47, which will be described later, carrying out comparatively bright combination is set for pixel data of pixel position n. In the case of a divided frame that has been read out first from among a plurality of divided frames, the nth pixel data is temporarily stored as is. When the second and subsequent divided frames have been read out (refer to step S51, which will describe later), the previous nth pixel position pixel data that has been stored in the memory 33 is compared with the nth pixel position pixel data that has been read out from the image sensor 4 this time, and replaced with the brightest pixel data (this processing is carried out in step S47, which will be described later). As a result, by carrying out comparatively bright combination there is an update to brighter pixel data, and in the case of shooting a moving subject (bright point) results in an image that represents the trajectory of the bright point.

For pixel data at the nth pixel position where the result of determination in step S23 is that it has been determined that the pixel level K is not larger than the reference value L, it is next determined whether or not the pixel level K is smaller than the reference value L (S27). This determination is carried out by comparing the pixel level K of pixel data for pixel position n that was detected in step S22 with the reference value L (refer to FIG. 9E).

Comparatively dark combination is carried out at the nth pixel position where the result of determination in step S27 was that the pixel level K was smaller than the reference value L (S29). Here, as a combination method for step S47, which will be described later, carrying out comparatively dark combination is set for nth pixel position pixel data. In the case of a divided frame that has been read out first from among a plurality of divided frames, the nth pixel position pixel data is temporarily stored as is. When the second and subsequent divided frames have been read out (refer to step S51, which will described later), the previously stored nth pixel position pixel data is compared with the nth pixel position pixel data that has been read out at this time, and replaced with the darker pixel data (this processing is carried out in step S47, which will be described later). As a result, by carrying out comparatively dark combination there is an update to darker pixel data, resulting in an image in which it is easier to see movement of dark portions. With the processing of step S29 the memory 33 is initialized with a pixel level K that has been read out from the image sensor 4.

At the nth pixel position where the result of determination in step S27 is that it has been determined that the pixel level K is not smaller than the reference value L, a pixel level L is stored (S31). This is a case where the pixel level K is the same as the reference value L. In this step, as a combination method for step S47, which will be described later, the reference value L is set for nth pixel position pixel data. In the case of a divided frame that has been read out first from among a plurality of divided frames, the nth pixel position pixel data is temporarily stored as is. When the second and subsequent divided frames have been read out also, at that pixel position (refer to step S51, which will be described later), nth pixel position pixel data is held at the reference value L (this processing is carried out in step S47, which will be described later). With the processing of step S31 the memory 33 is initialized with a pixel level K that has been read out from the image sensor 4.

In steps S25, S29 and S31, if determination of image combination method is set for every pixel position, and initialization of the memory 33, have been carried out, it is next determined whether or not pixel position n=final pixel (S33). In the next step S35, n representing pixel position is incremented, and in this step S33 it is determined whether or not nth pixel position pixel data that was read out in S22 is the final pixel.

If the result of determination in step S33 is that pixel position n is not the final pixel, n=n+1 is executed (S35). Here, 1 is added to n representing pixel number. This means that there is an advance by one in the X direction of FIG. 9A, or, if it is the final position in the X direction a return to the origin, and an advance by one in the Y direction. If 1 has been added to the pixel position n, processing returns to step S22, pixel data for the next pixel position is read out and the processing of steps S22-S31 is carried out.

If the result of determination in step S33 is that the pixel position n is the final pixel, processing advances to step S41 where the initial value that has been stored in the memory 33, and image data for the second and subsequent divided frames, are subjected to image combination. It is first determined whether or not all divided images have been completed (S41). Since the number of divided frames (division number) is detected in step S7, it is determined whether or not readout of image data has been completed for frames of this division number.

If the result of determination in step S41 is that not all divided images have been completed, then next, similarly to step S21, image position n for the next divided frame set to n=1 (S43). As was described previously, pixel position n represents a sequence for pixel data constituting image data.

If pixel position n has been set to n=1 in step S43, the nth pixel position pixel level K that has been read out from the image sensor 4 is determined (S45). Here, pixel level K of pixel data for an nth pixel position constituting the image data of a divided frame is detected.

Once the pixel level for K=n has been detected in step S45, combination is carried out in accordance with a determined combination method for each pixel position (S47). Specifically, in steps S25, S29 and S31, since a combination method for image combination has been set for every pixel position, in this step image combination, such as comparatively bright combination or comparatively dark combination, is carried out in accordance with the combination method that is set depending on the pixel.

Once combination in accordance with the combination method has been carried out in step S47, next, similarly to step S33, it is determined whether or not the pixel position n is the final pixel (S49). In step S51, which will be described later, n representing pixel position is incremented by 1, and in this step S49 it is determined whether or not nth pixel position pixel data that was read out in S45 is the final pixel.

If the result of determination in step S49 is that pixel position n is not the final pixel, n=n+1 is executed (S51), similarly to step S35. Here, 1 is added to n representing pixel position. If 1 has been added to n, processing returns to step S45, pixel data for the next pixel position is read out and the processing of steps S45-S49 is carried out. By repeating this processing, image combination such as comparatively bright combination is carried out for every pixel, of image data of a divided frame.

On the other hand, if the result of determination in step S49 is that the pixel position n is the final pixel, processing returns to step S41, and if image combination has not been completed for image data of all divided frames, image combination is carried out using image data of the next divided frame, in step S43 and after.

If the result of determination in step S41 is that image combination has been completed for image data of all divided frames, storage of a single frame image is carried out (S53). By executing steps S21-S53, image combination is carried out using frame images of a plurality of divided frames, and since a single frame image is combined, image data of this combined single frame is stored. In a case where a stored image is displayed on the display unit 37, processing is carried out in order to display on the display unit 37. In accordance with the image data storage method that has been adopted for the movie, a movie storage file is generated, and stored in external memory 36. Once image storage of a single frame has been carried out, the originating processing flow is returned to.

In this way, with the modified example of one embodiment of the present invention, bright combination is carried out when the pixel level K is larger than the reference value L, while dark combination is carried out if the pixel level K is smaller than the reference value L. As a result, a bright subject that is moving becomes prominent, and by combining subjecting movement of this bright image to bright combination, there is fluid movement in the movie. On the other hand, since a dark subject is difficult to see even if there is movement, and is likely to be lost in the background, carrying out dark combination results in an image that is easy to see with no distracting background movement.

With this embodiment, image combination for combining images of a plurality of divided frames is switched between comparatively bright combination and comparatively dark combination depending on a size relationship in the pixel level K and the reference value L, but this is not limiting, and the image combination may be only comparatively bright combination, may be only comparatively dark combination, may be the averaging combination, or may be comparative movement combination.

Also, with this embodiment, combination method has been determined by determining pixel level for each single pixel, but it is also possible to carry out combination processing by creating groups for a plurality of pixels, such as 2×2, 3×3, 4×4, and applying statistical processing so as to obtain an averaged value or a mean square value of a plurality of pixels, or a center value, maximum value or minimum value of distribution. In this case, a reduction in a memory region for storage can be expected.

Next, image combination of a modified example will be described using FIG. 9. FIG. 9A in the imaging surface of the image sensor 4, and comparatively bright combination or comparatively dark combination is carried out for each pixel arranged on the imaging surface. Pixels 4a are arranged two dimensionally in an x direction and y direction of the imaging surface of the image sensor 4. In the case where comparatively bright combination or comparatively dark combination is carried out, the pixel 4a is moved every one pixel in the x direction, and once the pixel has been moved for one line it is then moved in the y direction every one pixel, and comparatively bright combination or comparatively dark combination is carried out for all pixels.

A method of image combination for comparatively bright combination and comparatively dark combination is shown using FIG. 9B-FIG. 9E. FIG. 9B-FIG. 9F show an example with 4 as the division number. FIG. 9B-FIG. 9F show values of pixel data of pixels 4a of 1st to 4th divided frames, and of a combined image, along the horizontal direction (vertical direction shows the actual value).

Figure 9B:
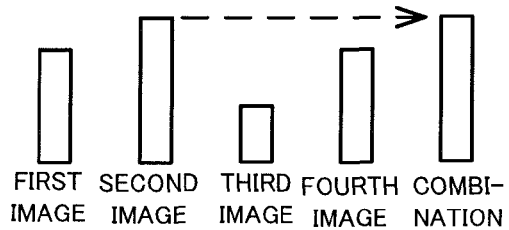

Comparatively bright combination is a combination method for combining images using pixel data of the brightest pixels, of each pixel, and with the example shown in FIG. 9B, since the second frame image data is the largest (brightest) image data of the second frame is adopted as the combined image.

Figure 9C:
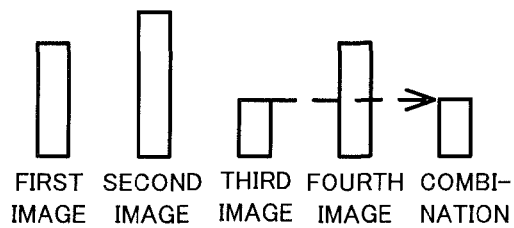

Comparatively dark combination is a combination method for combining images using pixel data of the darkest pixels, of each pixel, and with the example shown in FIG. 9C, since the third frame image data is the smallest (darkest) image data of the third frame is adopted as the combined image.

Figure 9D:
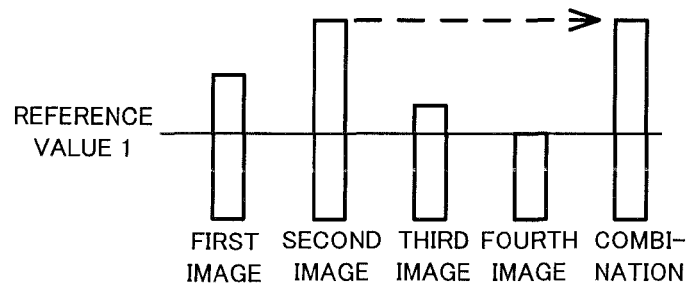
Figure 9E:
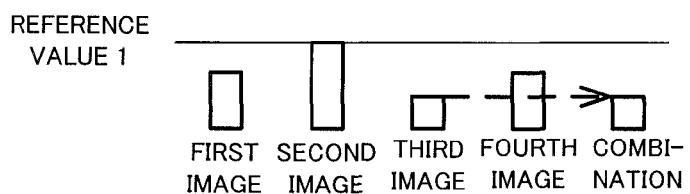

FIG. 9D and FIG. 9E show examples of a case where the threshold has been determined, and in a case where the pixel data is larger than the threshold (reference value L) comparatively bright combination is carried out, while if the pixel data is smaller than the threshold (reference value L) comparatively dark combination is carried out. Specifically, in FIG. 9D since pixel data of the first, second and third frames is larger than the threshold (reference value L), a combined image is generated using comparatively bright combination. On the other hand, in FIG. 9E the pixel data of the first to fourth frames are smaller than the threshold (reference value L), and so a combined image is generated using comparatively dark combination.

In this way, the threshold (reference value L) and the pixel data are compared, and is possible to generate a combined image while switching between comparatively bright combination and comparatively dark combination in accordance with the result of this comparison. In this case it is possible to select an appropriate combination method in accordance with the size of the pixel data.

Figure 9F:
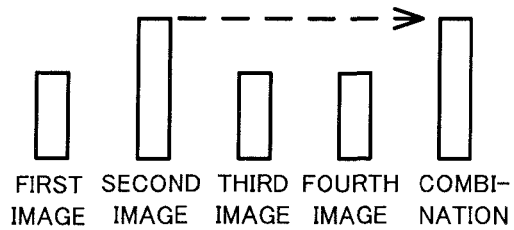

The example shown in FIG. 9F is a modified example of image combination, and the example shown here is a comparative movement combination. Comparative movement combination is a combination method adopting pixel data that is changing as pixel data of a combined image. In a case where the entire screen is moving, comparative movement combination can not determine whether or not there is movement in pixel units, and so this approach is not used in panning shots.

Describing the example of FIG. 9F, if pixel data of a second divided frame is acquired, whether or not a subject is moving is determined in a pixel that is a subject of comparison, using pixel data of first and second divided frames. In the case of FIG. 9F, since pixel data of the first and second divided frames is moving, it is determined that the subject is moving in a pixel that is the subject of comparison. Pixel data of the third and fourth divided frames is the same as pixel data of the first divided frame, and so with the third and fourth divided frames it is determined that the subject is not moving for pixels that are subjects of comparison. From these determination results, the pixel data of the second divided image is data for when the subject is moving, and so values of pixel data of the second divided frame are adopted as pixel data of the combined image.

In this way, with comparative movement combination, when dividing a single frame and generating a combined image from image data of a plurality of divided frames, since pixel data of pixels that are moving is adopted, it is possible to generate a movie with a feeling that the subject movement is emphasized.

As has been described above, with the one embodiment on the modified examples of the present invention, a frame period is divided so that image data is not saturated (refer to S7, S9 and S11 in FIG. 2, and to FIG. 3, FIG. 5 and FIG. 6), and a plurality of image data that have been acquired using the divided frames are subjected to image combination, to give an image for a single frame. Also, shutter speed at this time is made to be the same as the exposure period of a divided frame stop by an electronic shutter. As a result, at the time of movie recording, it is possible to make a movie such that it is possible to perform playback with each frame continuously joined. Also, since combination is possible using a memory region for a single divided frame, it is not necessary to install a large capacity memory.

Also, with the one embodiment and modified examples of the present invention, the level determination circuit 17 and divided frame number detection section 19 are constructed separately from the microcomputer 121, but some or all of these sections may be constituted by software, and executed by the microcomputer 121.

Further, with the one embodiment and modified example of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. In any event, it is possible to adopt the present invention as long as a device is for shooting movies.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device comprising:
an imaging unit, having an image sensor, for repeatedly carrying out imaging at a designated period, and outputting movie image data;
a divided period calculation section for obtaining a second period that is shorter than a first period based on a frame rate, the second period being an exposure time at which pixel data of the image sensor is no longer saturated;
a control circuit functioning as a switching designation section for selecting one of (A) the first period and (B) the second period, as the designated period at which the imaging unit repeatedly carries out imaging, the switching designation section selecting the first period if pixel data of the image sensor is not saturated when the designated period is the first period, and otherwise selecting the second period if pixel data of the image sensor is saturated when the designated period is the first period;
an image combining circuit for performing image combination on a plurality of image data that have been formed at the second period within the first period, to generate a combined image, the image combining circuit combining outputs for every respective corresponding pixel; and
the control circuit further carrying out control so that responsive to the switching designation section selecting the first period, image combination is not carried out by the image combining circuit on image data that was formed and otherwise, responsive to the switching designation section selecting the second period, carrying out image combination by the image combination circuit on a plurality of image data that was acquired within the first period to generate a combined image and acquire a movie.

2. The imaging device of claim 1, wherein:
the image combining circuit performs image combination after averaging processing of brightness information of the plurality of image data.

3. The imaging device of claim 1, wherein:
comparatively bright combination processing is used to perform image combination of the plurality of image data in the image combining circuit.

4. The imaging device of claim 1, wherein:
comparatively dark combination processing is used to perform image combination of the plurality of image data in the image combining circuit.

5. The imaging device of claim 1, wherein:
the image combining circuit carries out comparatively bright combination processing when brightness level of the plurality of image data is greater than a specified threshold level, and otherwise carries out comparatively dark combination processing when the brightness level is lower than the specified threshold level.

6. The imaging device of claim 5, wherein:
the threshold level is calculated based on image data before movie recording.

7. The imaging device of claim 1, wherein:
comparative movement combination processing is used to perform image combination of the plurality of image data in the image combining circuit.

8. The imaging device of claim 1, wherein:
the second period is a period at which movie image data from the imaging unit does not become saturated.

9. The imaging device of claim 1, wherein:
the second period corresponds to a shutter speed for exposing a subject to obtain movie image data from the imaging unit.

10. The imaging device of claim 1, wherein the second period defines a plurality of equal temporal length imaging frames, whose combined temporal length is less than or equal to a temporal length of a single imaging frame at the first period.

11. An imaging method comprising:
repeatedly carrying out imaging at a designated period, and outputting movie image data;

obtaining a second period that is shorter than a first period based on a frame rate, the second period being an exposure time at which pixel data of the image sensor is no longer saturated;

selecting one of (A) the first period and (B) the second period, as the designated period at which imaging is carried out, wherein the first period is selected if pixel data of the image sensor is not saturated when the designated period is the first period, and otherwise, the second period is selected if the pixel data of the image sensor is saturated when the designated period is the first period; and responsive to a selection of the first period as the designated period used to repeatedly carry out imaging, not performing image combination on image data that was formed and otherwise, responsive to a selection of the second period as the designated period used to repeatedly carry out imaging, performing image combination on a plurality of image data that were acquired within the first period to generate a combined image and acquire a movie.

12. The imaging method of claim 11 wherein the second period defines a plurality of equal temporal length imaging frames, whose combined temporal length is less than or equal to a temporal length of a single imaging frame at the first period.

13. A non-transitory computer-readable medium storing a computer program for controlling a computing device for carrying out a method comprising:

repeatedly carrying out imaging at a designated period, and outputting movie image data;

obtaining a second period that is shorter than a first period based on a frame rate, the second period being an exposure time at which pixel data of the image sensor is no longer saturated;

selecting one of (A) the first period and (B) the second period, as the designated period at which imaging is repeatedly carried out, wherein the first period is selected if pixel data of the image sensor is not saturated when the designated period is the first period, and otherwise, the second period is selected if the pixel data of the image sensor is saturated when the designated period is the first period; and responsive to a selection of the first period as the designated period used to repeatedly carry out imaging, not performing image combination on image data that was formed and otherwise, responsive to a selection of the second period as the designated period used to repeatedly carry out imaging, performing image combination on a plurality of image data that were acquired within the first period to generate a combined image and acquire a movie.

14. The non-transitory computer-readable medium of claim 13 wherein the second period defines a plurality of equal temporal length imaging frames, whose combined temporal length is less than or equal to a temporal length of a single imaging frame at the first period.

* * * * *